US009032006B2

(12) United States Patent
Bekas et al.

(10) Patent No.: US 9,032,006 B2
(45) Date of Patent: May 12, 2015

(54) PROCESSING OF LINEAR SYSTEMS OF EQUATIONS

(75) Inventors: Konstantinos Bekas, Rueschlikon (CH); Alessandro Curioni, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 13/202,230

(22) PCT Filed: Mar. 3, 2010

(86) PCT No.: PCT/IB2010/050912
§ 371 (c)(1),
(2), (4) Date: Aug. 18, 2011

(87) PCT Pub. No.: WO2010/109359
PCT Pub. Date: Sep. 30, 2010

(65) Prior Publication Data
US 2012/0005247 A1 Jan. 5, 2012

(30) Foreign Application Priority Data
Mar. 24, 2009 (EP) .................................... 09156017

(51) Int. Cl.
G06F 7/38 (2006.01)
G06F 7/32 (2006.01)
G06F 17/12 (2006.01)
(52) U.S. Cl.
CPC ...................................... *G06F 17/12* (2013.01)
(58) Field of Classification Search
USPC ......................................... 708/446, 514, 520
See application file for complete search history.

(56) References Cited

U.S. PATENT DOCUMENTS

2006/0129351 A1* 6/2006 Washizawa .................... 702/179
2009/0248778 A1* 10/2009 Magerlein ...................... 708/520
2011/0010409 A1* 1/2011 DeLaquil et al. .............. 708/446

OTHER PUBLICATIONS

Buttari, A., Dongarra, J., Langou, J., Langou, J., Luszczek, P., Kurzak, J.: "Mixed precision iterative refinement techniques for the solution of dense linear systems," Int. J. High Performance Computer Applications, vol. 21, pp. 457-466, 2007.*

(Continued)

*Primary Examiner* — Chuong D Ngo
*Assistant Examiner* — Matthew Sandifer
(74) *Attorney, Agent, or Firm* — Scully, Scott, Murphy & Presser, P.C.; Jeff Tang, Esq.

(57) ABSTRACT

Apparatus and method for processing linear systems of equations and finding a n×1 vector x satisfying Ax=b where A is a symmetric, positive-definite n×n matrix corresponding to n×n predefined high-precision elements and b is an n1 vector corresponding to n predefined high-precision elements. A first iterative process generates n low-precision elements corresponding to an n×1 vector x1 satisfying A1x1=b1 where A1, b1 are elements in low precision. The elements are converted to high-precision data elements to obtain a current solution vector x. A second iterative process generates n low-precision data elements corresponding to an n×1 correction vector dependent on the difference between the vector b and the vector product Ax. Then there is produced from the n low-precision data elements of the correction vector respective high-precision data elements of an n×1 update vector u. The data elements of the current solution vector x are updated such that x=x+u.

19 Claims, 3 Drawing Sheets

(56) References Cited

OTHER PUBLICATIONS

International Search Report for International Application No. PCT/IB2010/050912 dated May 11, 2011.

Strzodka, R., et al., "Pipelined Mixed Precision Algorithms on FPGAs for Fast and Accurate PDE Solvers from Low Precision Components", IEEE, XP031022179, pp. 259-270 (Apr. 1, 2006).

Göddeke, D., et al., "Performance and accuracy of hardware-oriented native-, emulated- and mixed-precision solvers in FEM simulations", *International Journal of Parallel, Emergent and Distributed Systems*, 22(4):221-256 (Jan. 2007).

Baboulin, M., et al., "Accelerating scientific computations with mixed precision algorithms", *Computer Physics Communication*, 180(12): 2526-2533 (Nov. 13, 2008).

Buttari, A., et al, "Using Mixed Precision for Sparse Matrix Computations to Enhance the Performance while Achieving 64-bit Accuracy", *ACM Transactions on Mathematical Software*, 34(4): 17-1 (Jul. 1, 2008).

\* cited by examiner

|  | n = 10000 | n = 20000 | n = 30000 | n = 40000 | n = 50000 |
|---|---|---|---|---|---|
| Memory, prior art | 0.381GB | 1.54GB | 3.43GB | 6.1GB | 9.54GB |
| Memory, k=100 | 0.003GB | 0.007GB | 0.011GB | 0.015GB | 0.019GB |
| Memory, k=200 | 0.006GB | 0.0014GB | 0.022GB | 0.03GB | 0.038GB |
| Memory, k=500 | 0.015GB | 0.035GB | 0.055GB | 0.075GB | 0.095GB |
| Memory, k=1000 | 0.03GB | 0.07GB | 0.11GB | 0.15GB | 0.19GB |

PROCESSING OF LINEAR SYSTEMS OF EQUATIONS

This application is the U.S. National Stage of International Application No. PCT/IB2010/050912, filed Mar. 3, 2010, which designates the U.S., published in English, and claims the benefit of European Application No. 09156017.7, filed Mar. 24, 2009.

Modern processors are typically capable of performing processing operations in high and low precision. The precision determines the number of bits which can be used to represent the fractional part of floating point numbers. The terms "high" and "low" here are simply used to distinguish two different levels of precision (and hence numbers of "fractional bits"), one being higher than the other, and do not imply any particular constraints on the individual precision levels. Hence, the actual numbers of fractional bits used in low and high precision can vary substantially from system to system. For example, the current IEEE standard specifies 32 bits, equivalent to 8 decimal digits after the decimal point, for low-precision (also called "single-precision") processing, and 64 bits, equivalent to 16 decimal digits after the decimal point, for high-precision (or "double-precision") processing. Many embedded systems use different specifications, however, for instance 8 and 16 bits, or 10 and 20 bits.

Depending on the type of processor, low-precision and high-precision operations may be implemented by dedicated processing logic or by appropriate software-control of the same processor hardware. Either way, low-precision operation is less complex and significantly faster than high-precision operation. Where complex tasks require high-precision results, a "mixed-precision" approach may therefore be employed. With mixed-precision processing, some components of a task are performed in low-precision, and other components in high-precision, with the overall result being obtained in high-precision. An example of such a processing task which is fundamental to numerous science and engineering applications is the solution of a linear system of equations. This task requires the processor to generate n high-precision data elements corresponding to the elements of a vector x, of dimensions n×1, such that $$Ax=b$$

where A is a symmetric, positive-definite matrix of dimensions n×n, and b is a vector of dimensions n×1. Matrix A is defined by n×n high-precision data elements which must be stored in memory and accessed when required for the processing operation. Right hand vector b is similarly defined by n high-precision data elements stored in system memory. When the matrix A is dense, the task of generating the high-precision data elements corresponding to solution vector x is highly processor intensive. In particular, when all elements of the coefficient matrix A are non-zero, the task requires a number of arithmetic operations in the processor that grows cubically with the dimension n of matrix A.

Thus far, mixed-precision approaches to the above task have been based on matrix decompositions (transformations). The basic steps of the processing operation are as follows. First, the matrix A must be constructed from n×n high-precision data elements and stored in system memory. The matrix A is then demoted (rounded) to produce a low-precision copy $A_l$ in system memory. This is done by converting the high-precision data elements of matrix A to respective low-precision data elements by an appropriate rounding process. Next, the processor implements a decomposition process whereby the matrix $A_l$ is decomposed as follows:

$$A_l = LL^T$$

where L is a lower triangular matrix and $L^T$ denotes its transpose. The transformation is performed by means of the Cholesky decomposition. This technique is well known in the art and need not be discussed in detail here. What is important to note is that, while the decomposition can be implemented by low-precision hardware, the cost of this decomposition grows as the cube of the dimension n. The subsequent processing to generate the data elements of a vector solution for a linear system with coefficient matrices L and $L^T$ then requires a cost that grows quadratically with the matrix dimension n. This is done using a method of iterative refinement as follows.

An initial, low-precision approximate solution vector $x_l$ for $Ax=b$ is obtained by solving $L(L^T x_l)=b_l$ where $b_l$ is an n×1 vector with elements corresponding to the n×1 data elements of vector b in low precision. The low-precision data elements of vector $x_l$ are promoted to respective high-precision data elements by an appropriate conversion process to obtain a current solution vector x. This can be done in various ways, e.g. by selecting the closest high-precision value in each case. Then, n high-precision data elements are generated corresponding to a current n×1 residual (error) vector r such that $$r=b-Ax$$

The processor then implements an iterative process until convergence:
1) generate n low-precision data elements corresponding to an n×1 vector z in the linear system $L(L^T z)=r_l$ where $r_l$ corresponds to the current error vector r converted to low precision;
2) convert the data elements of vector z to high-precision elements to obtain the high-precision vector $z_h$;
3) update the data elements of the current, high-precision solution vector x such that $x=x+z_h$;
4) update the data elements of the current, high-precision error vector r such that $r=b-Ax$;
5) repeat steps 1 to 4 until convergence is detected (typically when r is small enough or no progress is being made).

In the above process, the Cholesky decomposition requires the matrix A to be formed in memory at the outset. This matrix is then retrieved from memory by the processor each time the high-precision error vector r is calculated in the subsequent operation. In typical applications, the matrix A can be very large, for example of dimension n=10,000 or even much greater, resulting in considerable traffic between the processor and memory subsystem. The matrix transformation process is difficult to implement in a parallel-processing environment due to the level of processor coordination required, and existing techniques do not scale well. In addition as noted above, the overall complexity remains cubic with respect to the dimension n of matrix A. These and other issues limit overall processing efficiency and can restrict the type of hardware able to cope with the processing demands of many applications. Indeed, the cubic complexity alone limits the size of problems that can be handled by current single- and parallel-processor based computing systems.

One aspect of the present invention provides apparatus for generating n high-precision data elements corresponding to an n×1 vector x satisfying Ax=b where A is a symmetric, positive-definite n×n matrix corresponding to n×n predefined high-precision data elements and b is an n×1 vector corresponding to n predefined high-precision data elements. The apparatus comprises memory for storing input data defining said data elements of matrix A and of vector b, and control logic adapted to:

(a) implement a first iterative process for generating from said input data n low-precision data elements corresponding to an n×1 vector $x_l$ satisfying $A_l x_l = b_l$, where $A_l$ is an n×n matrix corresponding to the n×n data elements of matrix A in low precision and $b_l$ is an n×1 vector corresponding to the n×1 data elements of vector b in low precision, the control logic terminating the first iterative process on occurrence of a first convergence condition;

(b) convert the data elements of vector $x_l$ to high-precision data elements to obtain a current solution vector x;

(c) implement a second iterative process for generating n low-precision data elements corresponding to an n×1 correction vector dependent on the difference between the vector b and the vector product Ax, the control logic terminating the second iterative process on occurrence of a second convergence condition;

(d) produce from the n low-precision data elements of said correction vector respective high-precision data elements of an n×1 update vector u;

(e) update the data elements of said current solution vector x such that x=x+u; and (f) perform steps (c) to (e) until occurrence of a third convergence condition.

Instead of the Cholesky decomposition-based technique of the prior approach, embodiments of this invention implement an iterative process for generating the low-precision data elements of the solution vector $x_l$ in step (a), and also implement an iterative process for generating the low-precision data elements of the correction vector (step (c)) which is used to update the current high-precision solution vector x. No matrix transformation is required in this process, but advantage can still be taken of the accelerated performance of low-precision processing. Each iterative refinement step incurs a quadratic cost with respect to matrix size n, so the overall cost of the processing operation grows in the worst case only quadratically with matrix size n as compared with the cubic cost of the prior system. Moreover, the entire processing operation can be implemented using only the matrix vector product of matrix A with another vector ($x_l$ in step (a) and the correction vector in step (c)). This avoids the parallel-processing problem associated with the transformation-based process discussed above. Indeed, operations based on matrix vector products are particularly amenable to parallel implementation, whereby embodiments of the invention can be realized in massively-parallel implementations. In addition to this, the formation of matrix A is not a prerequisite for operation of the processing apparatus. As explained above, in the prior technique the matrix A must first be constructed in memory and is then retrieved from memory in each iteration for generating the error vector r. In contrast, the vector products required in embodiments of this invention can be generated without ever forming matrix A. In particular, it is common practice to define the matrix A as a certain function, whereby the computation of a matrix vector product with A is simple and computationally cheap. This will be described further below, but the effect is to substantially simplify processing and dramatically reduce traffic to the memory subsystem since loading of a preformed matrix from memory can be avoided in every iteration.

Further enhancements in operating efficiency stem from the use of iterative processes in steps (a) and (c). In the prior system, the solution of a linear system based on the decomposition $LL_T$ is obtained to a specific accuracy in each pass of the iterative process. For example, solution of $L(L^T z) = r_l$ for z involves a fixed number of steps and yields a vector z of a defined precision, i.e. having data elements corresponding to values calculated to the number of bits available for the low-precision process. This imposes a much more strict accuracy requirement than the theoretical properties of iterative refinement require. Each of the iterative processes of steps (a) and (c) above is terminated by the control logic on occurrence of a predetermined convergence condition, and this allows embodiments of the invention to adapt automatically to the required accuracy. A convergence condition is typically defined as the completion of a predetermined maximum number of iterations or convergence of the solution (achieving a solution according to a predetermined tolerance, or detecting no progress between iterations). Thus, not only are the iterative processes able to exploit fast, low precision logic, these processes terminate immediately a solution of the required accuracy is achieved. This is not possible with the standard matrix-factorization based system.

While the control logic might be adapted to perform steps (c) and (d) in various ways, these steps are preferably based on an error vector r which his dependent on the difference between the vector b and the vector product Ax, and in particular on the iterative generation of a correction vector whose matrix vector product with A depends on the error vector r. Hence, in preferred embodiments the control logic is adapted:

after generating the current solution vector x in step (b), to generate n data elements corresponding to a current n×1 error vector r indicative of the difference between the vector b and the vector product Ax;

to perform step (c) such that the vector product of the matrix $A_l$ with said correction vector is dependent on the error vector r; and in step (d), to produce the data elements of the update vector u by converting the data elements of the correction vector to high-precision data elements.

The data elements of the error vector r are preferably generated by the control logic in high precision such that r=b−Ax, and then converted to respective low precision data elements to obtain a low-precision error vector $r_l$. This can then be used in the second iterative process of step (c) such that the vector product of the matrix $A_l$ with the correction vector is equal to the low-precision error vector $r_l$. Then, in step (e), after updating the data elements of the current solution vector x, the control logic can update the data elements of the current error vector r such that r=b−Ax. In such embodiments, the third convergence condition is conveniently dependent on the current error vector r.

While alternatives can be envisaged, in preferred embodiments each of the first and second iterative processes comprises the well-known Conjugate Gradient method. In general, the various convergence conditions can be set as desired for a given application, but these conditions are preferably dependent on completion of a predetermined number of passes of the iterative process in question and/or detected convergence of the resulting solution (attainment of a solution vector to a predetermined tolerance or no detected progress between successive passes of the process).

The predefined data elements of matrix A and vector b could be individually predetermined in system memory or may be defined by the input data in any convenient manner. For example, as mentioned earlier, the input data defining the data elements of matrix A may comprise a function F defining application of matrix A on an arbitrary n×1 vector. That is, the function F defines application of each matrix A element a(i,j) on an element of any n×1 vector, where $1 \leq i \leq n$ and $1 \leq j \leq n$ are the row and column indices respectively of matrix A elements. In this case, the control logic is adapted to use the function F in performance of steps (a) to (e) for exceptionally fast and computationally inexpensive generation of matrix-vector products with A. In particular, processing operations involving matrix element a(i,j) can typically be done wholly in processor cache, and the memory traffic resulting from generation of a matrix vector product with A can be dramatically reduced over prior systems. This will be discussed further below.

Apparatus embodying the invention might be implemented by one or more processors using shared and/or individually-assigned memory resources. For most efficient operation, and especially in complex applications, the control logic ideally comprises a plurality of processors arranged to operate in parallel collectively to implement steps (a) to (e). In general, the processor(s) could use dedicated low- and high-precision hardware or use common hardware configurable by software for low- and high-precision operation. Where a plurality of processors are employed, these may be integrated in a single chip or dispersed over different chips of a uniprocessor and/or multicore processor based computing system, e.g. over multiple computers of a distributed computing system. Similarly, the memory utilised in operation of apparatus embodying the invention may comprise one or more components of one or more types of storage, from local processor cache memory to main storage such as disk or back-up storage media, and such memory or components thereof may be wholly or partly shared by different processors of the control logic.

A second aspect of the invention provides a computer program for causing a computer to generate n high-precision data elements corresponding to an n×1 vector x satisfying Ax=b where A is a symmetric, positive-definite n×n matrix corresponding to n×n predefined high-precision data elements and b is an n×1 vector corresponding to n predefined high-precision data elements. The computer program comprises program code means for causing the computer to access input data, stored in memory of the computer and defining said data elements of matrix A and of vector b, and to:

(a) implement a first iterative process for generating from said input data n low-precision data elements corresponding to an n×1 vector $x_l$ satisfying $A_l x_l = b_l$, where $A_l$ is an n×n matrix corresponding to the n×n data elements of matrix A in low precision and $b_l$ is an n×1 vector corresponding to the n×1 data elements of vector b in low precision, and terminate the first iterative process on occurrence of a first convergence condition;

(b) convert the data elements of vector $x_l$ to high-precision data elements to obtain a current solution vector x;

(c) implement a second iterative process for generating n low-precision data elements corresponding to an n×1 correction vector dependent on the difference between the vector b and the vector product Ax, and terminate the second iterative process on occurrence of a second convergence condition;

(d) produce from the n low-precision data elements of said correction vector respective high-precision data elements of an n×1 update vector u;

(e) update the data elements of said current solution vector x such that x=x+u; and (f) perform steps (c) to (e) until occurrence of a third convergence condition.

It will be understood that the term "computer" is used in the most general sense and includes any device, component or system having a data processing capability for implementing a computer program, and may thus comprise one or more processors of a single device or distributed system of devices as discussed above. Moreover, a computer program embodying the invention may constitute an independent program or program set, or may be part of a larger program or program set, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

In general, where features are described herein with reference to an embodiment of one aspect of the invention, corresponding features may be provided in embodiments of another aspect of the invention.

Preferred embodiments of the invention will now be described, by way of example, with reference to the accompanying drawings in which.

Figure 1:
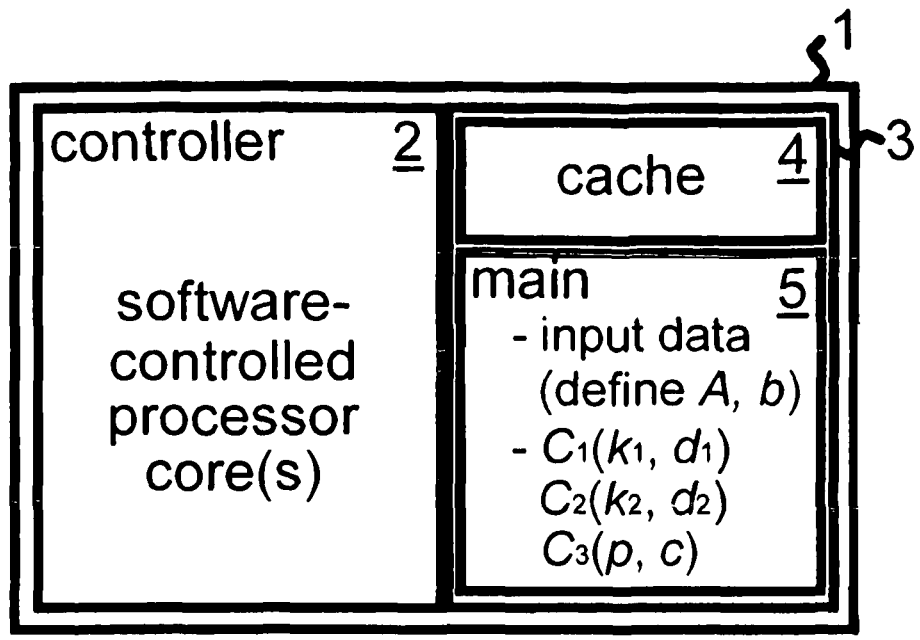
FIG. 1 is a schematic block diagram of processing apparatus embodying the invention.

FIG. 1 is a simplified schematic of processing apparatus embodying the invention indicating the main components involved in the operation to be described. The apparatus 1 comprises control logic, represented in the figure by controller 2, and memory 3 represented in simplified form here by cache memory 4 and main memory 5. The control logic of controller 2 comprises both high- and low-precision logic whereby controller 2 can perform processing operations in high and low precision. In general, the control logic of controller 2 may be implemented in hardware or software or a combination thereof. In this embodiment, however, the logic is implemented by one or more processor cores which are configured by software to perform the functions described. Suitable software will be apparent to those skilled in the art from the description herein. While in general the high- and low precision operations to be described might be performed by different processors of apparatus 1, in the present example we assume that the processor(s) of controller 1 are individually operable under software control to perform operations in high or low precision. Cache memory 4 here represents the main working memory of controller 2, e.g. level 1 cache memory. Main memory 5 represents the remainder of the memory subsystem accessible by controller 2 and may include various types of storage such as additional cache levels, hard disk and backup storage media.

The apparatus 1 is adapted to implement a process for generating n high-precision data elements corresponding to an n×1 vector x representing the solution of a linear system of equations defined by $$Ax=b.$$

Here, A is a symmetric, positive-definite, dense matrix of dimensions n×n and b is an n×1 vector. The n×n high-precision data elements corresponding to the elements of matrix A and the n high-precision data elements corresponding to the elements of vector b are defined by input data stored in memory 5. More specifically, the high-precision data elements of matrix A are defined indirectly here via a scalar function F( )=a(i,j), where a(i,j) represents an element with row index i (1≤i≤n) and column index j (1≤j≤n). In this example we assume that the data elements of vector b are directly defined in memory 5. Memory 5 also holds data $C_1(k_1, d_1)$, $C_2(k_2, d_2)$, and $C_3(p, c)$ specifying the parameters defining three convergence conditions for use in the processing operation. These parameters will be explained in the following.

Figure 2:
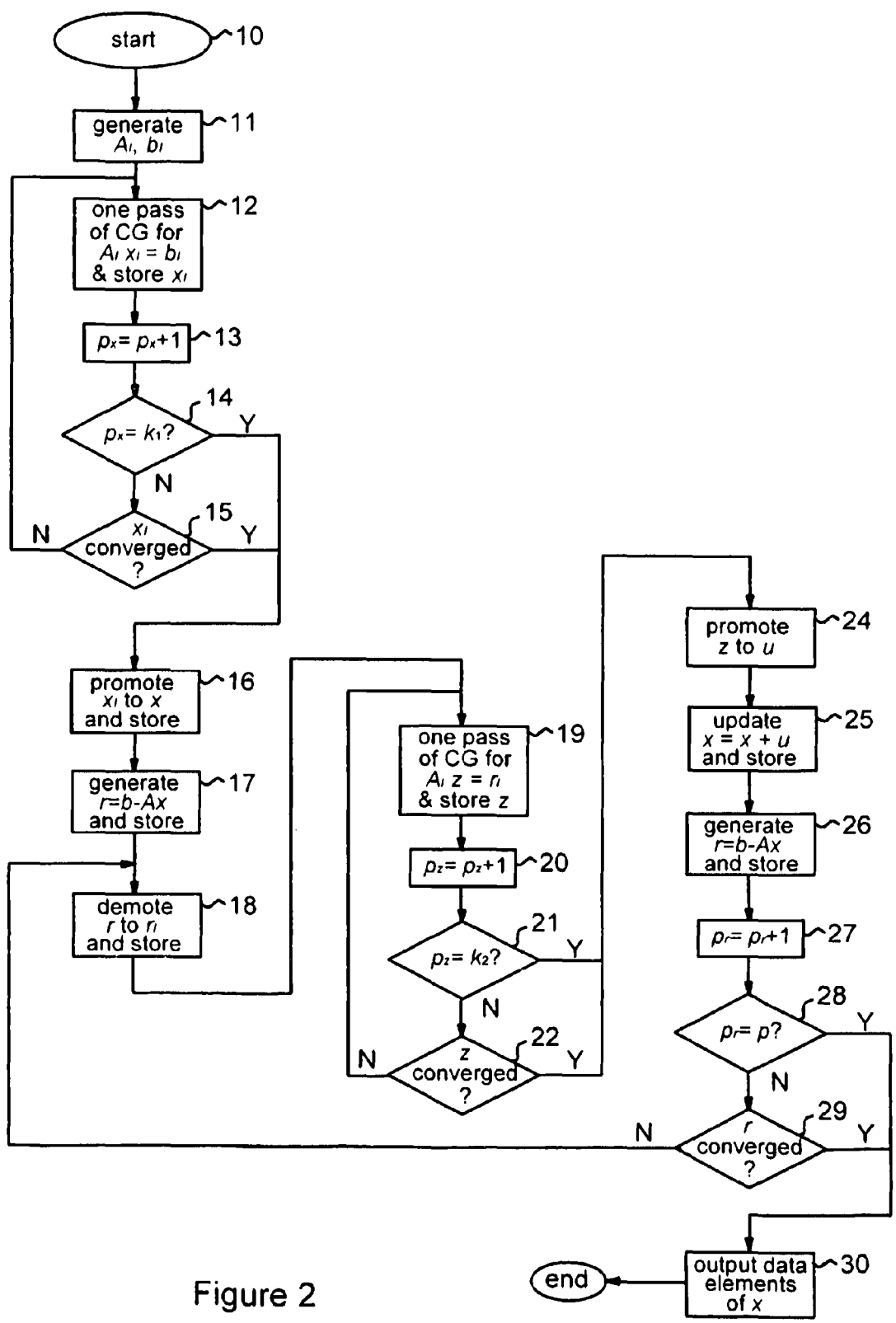
FIG. 2 is a flow chart indicating operation of the apparatus of FIG. 1.

The key steps performed by apparatus 1 to generate the high-precision data elements of solution vector x are indicated in the flow chart of FIG. 2. Operation commences at step 10, typically in response to an operator prompt via an I/O (input/output) interface (not shown) of the apparatus or a request from another application, whether running on a processor of controller 2 or a remote processor in communication with controller 2. In step 11, controller 2 accesses main memory 1 to retrieve the high-precision function F( ) and creates a low-precision copy $F_l( )$ in cache memory 4. This can be done in known manner by demoting, or rounding, the high-precision function to a low-precision representation. Similarly, controller 1 retrieves the high-precision data elements of vector b and demotes these to respective low-precision elements to produce a low-precision vector $b_l$. Depending on storage capacity and the dimension n, the data elements of vector $b_l$ may be retained in cache 4 or re-stored in main memory 5.

Next, in step 12 controller 1 performs one pass of a first iterative process for generating n low-precision data elements corresponding to an initial, approximate n×1 solution vector $x_l$ satisfying $$A_l x_l = b_l.$$

Here, $A_l$ is the n×n low-precision matrix defined by the function $F_l( )$. In this embodiment, the technique employed for the first iterative process is the conjugate gradient (CG) process. The CG process is a well known technique for the solution of linear systems of equations, and need not be described further here. The necessary calculations can be performed by controller 2 using only the function $F_l( )$ and the elements of vector $b_l$ which can be recalled from main memory 5 to cache 4 as required. The low-precision elements of vector $x_l$ obtained after one pass of the CG process are stored in memory 3, and operation proceeds to step 13 where a pass counter $p_x$ is incremented by one by controller 2. In decision step 14, controller 2 checks if the current pass count $p_x$ is equal to the preset parameter $k_1$ which indicates the maximum number of permitted passes of the first iterative process. Assuming not (decision "No" (N) at step 14), controller 2 then decides at decision step 15 if convergence of the solution $x_l$ has occurred. Convergence here is detected if either of two events has occurred. The first event is that a preset drop tolerance $d_1$ for $x_l$ has been reached. That is, controller 2 checks whether the current solution for $x_l$ differs from that obtained in the first pass by an amount $\geq d_1$, where the drop tolerance $d_1$ is typically specified as a percentage change. The second event is that no progress has been achieved in this pass of the process, i.e. that the solution for $x_l$ is unchanged from that obtained in the preceding pass. Assuming convergence is not detected at step 15, operation reverts to step 12 for another pass of the solution process. The process thus iterates until occurrence of a first convergence condition $C_1$ defined as the first-occurring of $k_1$ passes being completed at step 14 or convergence being identified at step 15. On detection of the convergence condition $C_1$ (decision "Yes" (Y) at step 14 or step 15), the controller 2 terminates the first iterative process.

On completion of the first iterative process, operation proceeds to step 16 where the controller 2 creates a high-precision copy of the solution vector $x_l$ output by the first iterative process. This can be done in known manner by converting the low-precision data elements of vector $x_l$ to respective high-precision data elements to obtain a current, high-precision solution vector x which is stored in memory 3. Next, in step 17 controller 2 generates n high-precision data elements corresponding to a current n×1 error vector r satisfying $$r = b - Ax.$$

This calculation can be performed using the function F( ) and the elements of vectors x and b which can be recalled to cache 4 as required. The resulting high-precision elements of error vector r are stored in memory 3 together with a low-precision copy $r_l$ of this error vector which is generated in step 18 by converting the elements of vector r to respective low-precision data elements.

In step 19, controller 2 then performs the first pass of a second iterative process for generating n low-precision data elements corresponding to an n×1 correction vector z satisfying $$A_l z = r_l.$$

Again, the conjugate gradient technique is used for the second iterative process in this example, and the necessary calculations can be performed by controller 2 using the function $F_l( )$. The low-precision elements of vector z obtained after one pass of the process are stored in memory 3, and operation proceeds to step 20 where a pass counter $p_z$ is incremented by one by controller 2. In decision step 21, controller 2 checks if the current pass count $p_z$ is equal to the preset parameter $k_2$ which indicates the maximum number of permitted passes of the second iterative process. If not, controller 2 determines at decision step 22 if convergence of the solution z has occurred. Convergence here is again detected if either (1) a preset drop tolerance $d_2$ for z has been reached or (2) no progress has been achieved in this pass of the process, i.e. that the solution for z is unchanged since the preceding pass. Assuming convergence is not detected at step 22, operation reverts to step 19 for another pass of the solution process. The process thus iterates until occurrence of second convergence condition $C_2$ defined as the first-occurring of $k_2$ passes being completed at step 21 or convergence being identified at step 22. On detection of the convergence condition $C_2$ (Y at step 21 or step 22), the controller 2 terminates the second iterative process.

On completion of the second iterative process, operation proceeds to step 24 where the controller 2 converts the data elements of the correction vector z to respective high-precision data elements to produce a high-precision update vector u which is stored in memory 3. Next, in step 25 the controller 2 updates the data elements of the current high-precision solution vector x such that $$x = x + u$$

and stores the updated solution x in memory 3. After updating the solution vector x, controller 2 updates current high-precision error vector r in step 26 such that:

$$r = b - Ax,$$

where again the calculation is performed using function F( ) defining matrix A. The high-precision elements of the new vector r are stored in memory 3, and operation proceeds to step 27 where a pass counter $p_r$ for a third iterative process is incremented by one by controller 2. In decision step 28, controller 2 checks if the current pass count $p_r$ is equal to the preset parameter p which indicates the maximum number of permitted passes of the third iterative process. If not, controller 2 determines at decision step 29 if convergence of the solution r has occurred. As before, convergence is detected if either (1) a preset tolerance c for r has been reached or (2) no progress has been achieved in the solution for r since the preceding pass of the process. In this case, the tolerance c specifies an error threshold, whereby an error vector r whose Euclidean norm is less than c is deemed within the required tolerance. Assuming convergence is not detected at step 29, operation reverts to step 18 for another pass of the third iterative process, requiring performance of the second iterative process again for the new error vector r. The process of steps 18 to 29 thus iterates until occurrence of a third convergence condition $C_3$ defined as the first-occurring of p passes being completed at step 28 or convergence of the solution for the error vector r being identified at step 29. On detection of the convergence condition $C_3$ (Y at step 28 or step 29), the controller 2 terminates the third iterative process. In step 30, the high-precision data elements corresponding to the final solution vector x are output to the operator or application which initiated the process, and the processing operation is complete.

The foregoing apparatus offers exceptional operating efficiency for the solution of linear systems of equations, even where the matrix A is dense and the dimension n very large. The apparatus exploits fast, low-precision processing, and the complexity of the processing operation is only $O(kn^2)$ for $k_1=k_2=k$. This is in marked contrast to the prior system described earlier which incurs a cost of $O(n^3)$.

Note that all the calculations involving matrix A or $A_l$ in the above process require only the matrix vector product of A or $A_l$ with another vector. These calculations do not require prior formation of matrix A, but can be performed by controller 2 using only the function F( ) or $F_l$( )) as appropriate and the elements of the vector in question which can be recalled as required from main memory 5 to cache 4. That is, the necessary processing operations involving matrix A (or $A_l$) can be performed entirely in processor cache. This dramatically reduces traffic between the processor(s) of controller 2 and the memory subsystem as compared with the prior approach described earlier. In particular, in the embodiment above the calculation of a matrix vector product with A (or $A_l$) requires only O(kn) of memory movements where k is typically small by comparison with dimension n. In contrast, the prior scheme requires matrix A to be formed in system memory prior to decomposition. This matrix is decomposed as $A=LL_T$ where L is a lower triangular matrix with O(n/2) elements. The matrix L, which is stored in lower precision, is used in all solution cases. The original matrix A in high precision is used in the calculation of the errors. Thus, in the prior system $O(n^2)$ of data needs to be moved from main memory to the processor in each iterative refinement step of that process.

The parameters defining the three convergence conditions $C_1(k_1, d_1)$, $C_2(k_2, d_2)$, and $C_3(p, c)$ can be set as desired for according to the accuracy required in a given application. In preferred embodiments, $k_1=k_2=k$ is selected for convenience of implementation, whereby the maximum number of passes is the same in the first and second iterative processes. Note that, unlike the process of calculating the error in the prior system, these processes need not fully solve towards the error vector r but can adapt automatically to the required accuracy.

Figure 3:
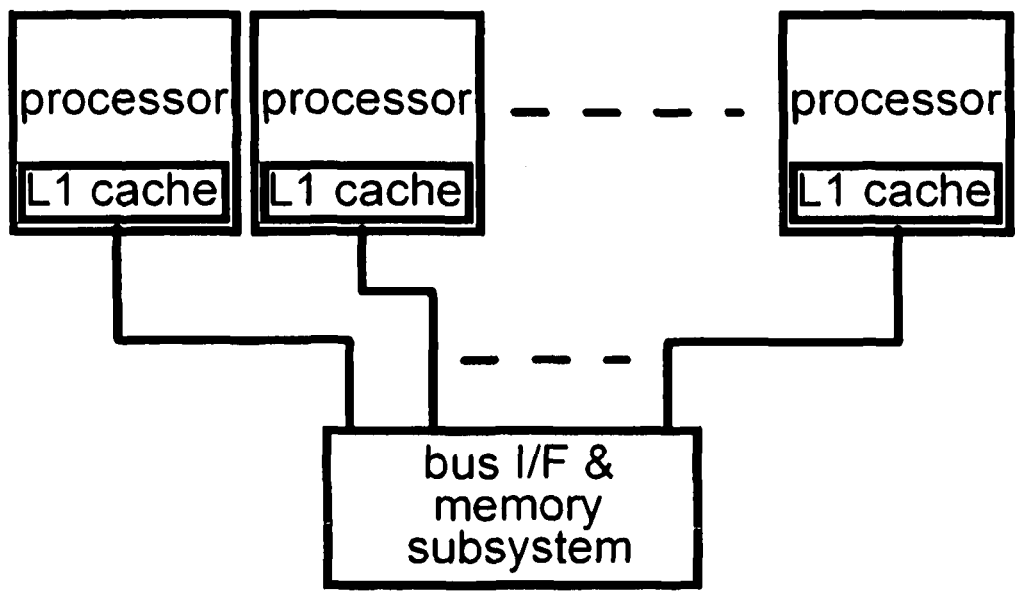
FIG. 3 illustrates an exemplary implementation of apparatus embodying the invention.
Figures 4, 5:
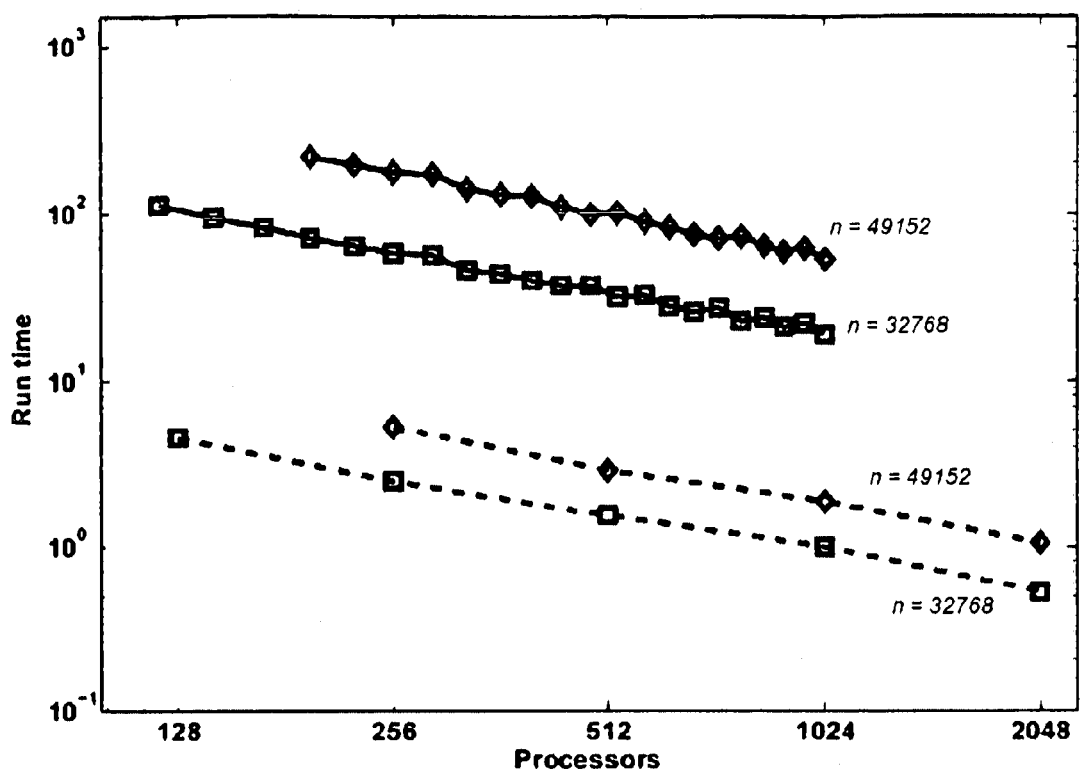
FIG. 4 is a graph comparing run times of embodiments of the invention with prior systems.
FIG. 5 is a table indicating memory usage in embodiments of the invention and prior systems.

As described earlier, apparatus 1 can be realized by a plurality of processors operating in parallel, these processors collectively implementing the processing operation described above. FIG. 3 illustrates a simple example of such an implementation. Here, the functionality of controller 2 is implemented by multiple processors, in this case having individual level one (L1) caches, which communicate via a bus interface (I/F) with a shared memory subsystem. Since the processing operation is based on matrix vector products, the number of processors used can be large. Such massively parallel implementations offer exceptional operating efficiency. FIG. 4 compares run times for embodiments of the invention and prior systems described above for two different values of matrix dimension n and various numbers of parallel processors. The vertical axis corresponds to run time and the horizontal axis corresponds to number of processors employed. The two values of matrix size n are 32768 and 49152. The upper pair of traces, shown in solid lines, corresponds to the prior scheme, and the lower pair of traces, in dashed lines, corresponds to embodiments of this invention. Note that the scale on the vertical axis is logarithmic. It is immediately clear that embodiments of the invention provide a substantial improvement, reducing run times by at least one order of magnitude.

Embodiments of the invention also offer significant memory usage and bandwidth improvements. The table of FIG. 5 indicates the memory usage (required bandwidth) in GBytes for each step of iterative refinement of the error vector r, using the prior scheme and embodiments of the invention as described above, for various sizes of matrix A. The top row in this table gives the results for the prior system with different values of n. The lower four rows give the results for different values of $k_1=k_2=k$ in the embodiment described. The dramatic improvement achieved by embodiments of the invention is readily apparent.

It will be appreciated that many changes and modifications can be made to the exemplary embodiments described above. By way of example, the convergence conditions for the iterative processes could be dependent on different sets of events to those specified and may depend in various ways on combinations of these events. Preferred embodiments always specify a maximum number of iterations for each process however. Where a tolerance is specified for a convergence condition, this could be defined in various ways as desired for a given application. Also, while the conjugate gradient method is employed in the first and second iterative processes above, other iterative solution techniques for linear systems of equations might be employed here if desired. Many other changes and modifications can be made to the embodiments described without departing from the scope of the invention.

The invention claimed is:

1. Apparatus for generating in high-precision data elements corresponding to an n×1 vector x satisfying Ax=b where A is a symmetric, positive-definite n×n matrix corresponding to n×n predefined high-precision data elements and b is an n×1 vector corresponding to n predefined high-precision data elements, the apparatus comprising memory for storing input data defining said data elements of matrix A and of vector b, and a processor implementing control logic adapted to:

(a) implement a first iterative process for generating from said input data in low-precision data elements corresponding to an n×1 vector $x_l$ satisfying $A_l x_l = b_l$, where $A_l$ is an n×n matrix corresponding to the n×n data elements of matrix A in low precision and $b_l$ is an n×1 vector corresponding to the n×1 data elements of vector b in low precision, the control logic terminating the first iterative process on occurrence of a first convergence condition;

(b) convert the data elements of vector $x_l$ to high-precision data elements to obtain a current solution vector x; and generate n data elements corresponding to a current n×1 error vector $r_l$ in low precision indicative of the difference between the vector b and the vector product Ax;

(c) implement a second iterative process for generating n low-precision data elements corresponding to an n×1 correction vector dependent on the difference between the vector b and the vector product Ax, the control logic terminating the second iterative process on occurrence of a second convergence condition; wherein a vector product of the matrix $A_l$ with said correction vector is equal to the low-precision error vector $r_l$;

(d) produce from the n low-precision data elements of said correction vector respective high-precision data elements of an n×1 update vector u;

(e) update the data elements of said current solution vector x such that x=x+u; and (f) perform steps (c) to (e) until occurrence of a third convergence condition, said input data defining the data elements of matrix A comprising a function F defining application of each matrix A element a(i,j) on an element of any n×1 vector, where 1≤i≤n and 1≤j≤n are the row and column indices respectively of matrix A elements, the control logic being adapted to use said function F in performance of steps (a) to (e) without having to form said matrix A, wherein processing operations for solving linear systems of equations involving said matrix A elements a(i,j) are performed in said memory, and memory accesses resulting from generation of a matrix vector product with matrix A is substantially reduced.

2. Apparatus as claimed in claim 1 wherein the control logic is adapted:
in step (d), to produce the data elements of the update vector u by converting the data elements of the correction vector to high-precision data elements.

3. Apparatus as claimed in claim 2 wherein the control logic is adapted:
to generate the data elements of the error vector r in high precision such that r=b−Ax;
to convert the data elements of the error vector r to respective low precision data elements to obtain the low-precision error vector $r_l$; and
in step (e), after updating the data elements of the current solution vector x, to update the data elements of the current error vector r such that r=b−Ax;
wherein the third convergence condition is dependent on the current error vector r.

4. Apparatus as claimed in claim 3 wherein the third convergence condition is dependent on at least one, or on the first occurring, of:
completion of a predetermined number of passes of steps (c) to (e);
attainment of a solution for a vector dependent on the current solution vector x to a predetermined tolerance; and
no detected change in the solution for said vector dependent on the current solution vector x in successive passes of steps (c) to (e).

5. Apparatus as claimed in claim 4 wherein said vector dependent on the current solution vector x comprises the current error vector r.

6. Apparatus as claimed in claim 1 wherein the first convergence condition is dependent on at least one, or on the first occurring, of:
completion of a predetermined number of passes of the first iterative process;
attainment of a solution for the vector $x_l$ to a predetermined tolerance; and
no detected change in the solution for the vector $x_l$ in successive passes of the first iterative process.

7. Apparatus as claimed in claim 1 wherein the second convergence condition is dependent on at least one, or on the first occurring, of:

completion of a predetermined number of passes of the second iterative process;
attainment of a solution for the correction vector to a predetermined tolerance; and
no detected change in the solution for the correction vector in successive passes of the first iterative process.

8. Apparatus as claimed in claim 1 wherein the first iterative process comprises the Conjugate Gradient method.

9. Apparatus as claimed in claim 1 wherein the second iterative process comprises the Conjugate Gradient method.

10. Apparatus as claimed in claim 1 wherein the control logic comprises a plurality of processors arranged to operate in parallel collectively to implement steps (a) to (e).

11. A non-transitory computer readable medium containing executable program instructions for causing a computer to generate n high-precision data elements corresponding to an n×1 vector x satisfying Ax=b where A is a symmetric, positive-definite n×n matrix corresponding to n×n predefined high-precision data elements and b is an n×1 vector corresponding to n predefined high-precision data elements, the executable program instructions comprising instructions for causing the computer to access input data, stored in memory of the computer and defining said data elements of matrix A and of vector b, and for causing the computer to:

(a) implement a first iterative process for generating from said input data n low-precision data elements corresponding to an n×1 vector $x_l$ satisfying $A_l x_l$=$b_l$, where $A_l$ is an n×n matrix corresponding to the n×n data elements of matrix A in low precision and $b_l$ is an n×1 vector corresponding to the n×1 data elements of vector b in low precision, and terminate the first iterative process on occurrence of a first convergence condition;

(b) convert the data elements of vector $x_l$ to high-precision data elements to obtain a current solution vector x; and generate n data elements corresponding to a current n×1 error vector $r_l$ in low precision indicative of the difference between the vector b and the vector product Ax;

(c) implement a second iterative process for generating in low-precision data elements corresponding to an n×1 correction vector dependent on the difference between the vector b and the vector product Ax, and terminate the second iterative process on occurrence of a second convergence condition; wherein a vector product of the matrix $A_l$ with said correction vector is equal to the low-precision error vector $r_l$;

(d) produce from the n low-precision data elements of said correction vector respective high-precision data elements of an n×1 update vector u;

(e) update the data elements of said current solution vector x such that x=x+u; and (f) perform steps (c) to (e) until occurrence of a third convergence condition, said input data defining the data elements of matrix A comprising a function F defining application of each matrix A element a(i,j) on an element of any n×1 vector, where 1≤i≤n and 1≤j≤n are the row and column indices respectively of matrix A elements, the executable program instructions including instructions for causing the computer to use said function F in performance of steps (a) to (e) without having to form said matrix A, wherein processing operations for solving linear systems of equations involving said matrix A elements a(i,j) are performed in said memory, and memory accesses resulting from generation of a matrix vector product with A is substantially reduced.

12. A computer readable medium as claimed in claim 11 wherein the executable program instructions include instructions for causing the computer:

in step (d), to produce the data elements of the update vector u by converting the data elements of the correction vector to high-precision data elements.

13. A computer readable medium as claimed in claim 12 wherein the executable program instructions include instructions for causing the computer:

to generate the data elements of the error vector r in high precision such that r=b−Ax:

to convert the data elements of the error vector r to respective low precision data elements to obtain the low-precision error vector $r_l$;

in step (e), after updating the data elements of the current solution vector x, to update the data elements of the current error vector r such that r=b−Ax;

wherein the third convergence condition is dependent on the current error vector r.

14. A computer readable medium according to claim 13 wherein said third convergence condition is dependent on the first occurring of:

completion of a predetermined number of passes of steps (c) to (e);

attainment of a solution for the current error vector r to a predetermined tolerance; and no detected change in the solution for said vector dependent on the current solution vector x in successive passes of steps (c) to (e).

15. A computer readable medium as claimed in claim 11 wherein the first convergence condition is dependent on at least one, or on the first occurring, of:

completion of a predetermined number of passes of the first iterative process;

attainment of a solution for the vector $x_l$ to a predetermined tolerance; and no detected change in the solution for the vector $x_l$ in successive passes of the first iterative process.

16. A computer readable medium according to claim 11 wherein said second convergence condition is dependent on the first occurring of:

completion of a predetermined number of passes of the second iterative process;

attainment of a solution for the correction vector to a predetermined tolerance; and no detected change in the solution for the correction vector in successive passes of the first iterative process.

17. A computer readable medium according to claim 11 wherein said third convergence condition is dependent on the first occurring of:

completion of a predetermined number of passes of steps (c) to (e);

attainment of a solution for a vector dependent on the current solution vector x to a predetermined tolerance; and no detected change in the solution for said vector dependent on the current solution vector x in successive passes of steps (c) to (e).

18. A computer readable medium according to claim 11 wherein the first iterative process comprises the Conjugate Gradient method.

19. A computer readable medium according to claim 11 wherein the second iterative process comprises the Conjugate Gradient method.

\* \* \* \* \*